Oct. 27, 1970   J. W. DAVIS   3,536,362

VEHICLE ANTISKID BRAKING SYSTEMS

Filed Dec. 4, 1968   3 Sheets-Sheet 2

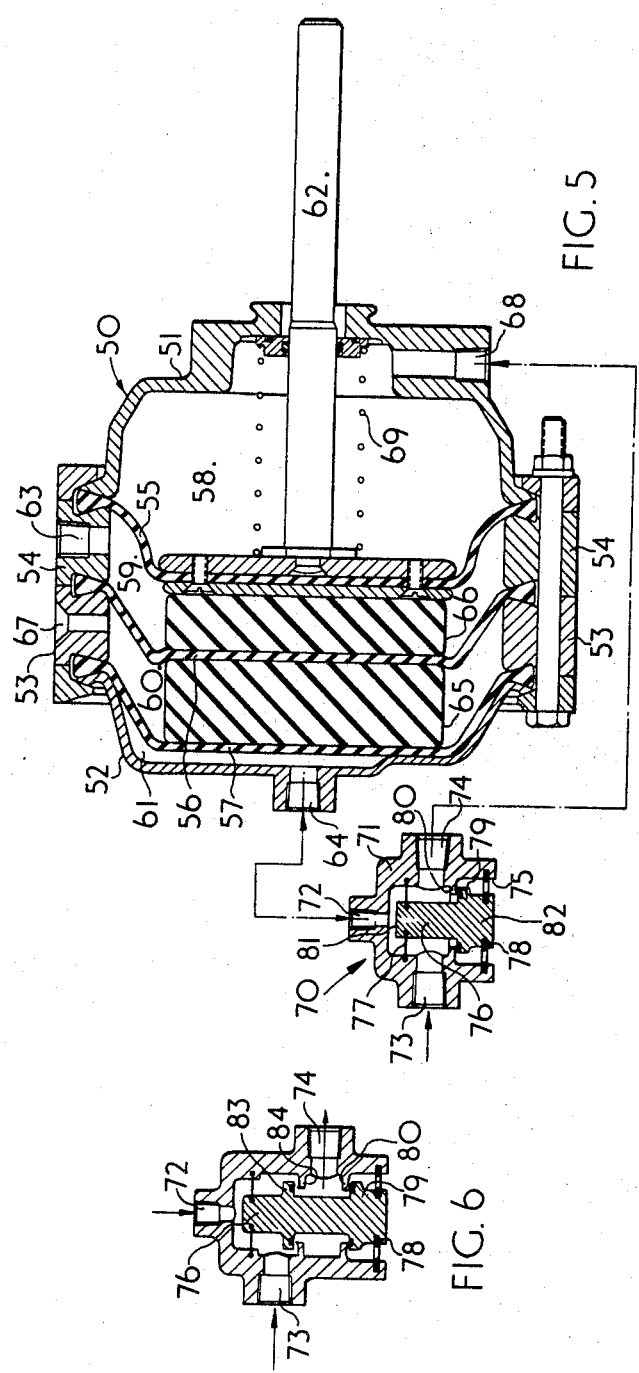

3,536,362
Patented Oct. 27, 1970

3,536,362
VEHICLE ANTISKID BRAKING SYSTEMS
John Walter Davis, Balsall Common, Coventry, England, assignor to The Dunlop Company Limited, London, England
Filed Dec. 4, 1968, Ser. No. 779,402
Claims priority, application Great Britain, Dec. 6, 1967, 55,508/67
Int. Cl. B60t 8/00, 13/10, 13/36
U.S. Cl. 303—21                                      23 Claims

ABSTRACT OF THE DISCLOSURE

A brake actuating mechanism comprising a diaphragm which can be displaced in one direction by an increase in pressure in a brake applying chamber to effect application of the brake and which can be displaced in the opposite direction by an increase in pressure in an antiskid chamber to effect release of the brake, and a mechanical linkage operable by a hand brake lever to displace the diaphragm in a brake applying direction and to open the antiskid chamber to exhaust.

---

This invention relates to vehicle wheel brake actuating systems of the kind comprising a mechanism for applying a brake and an antiskid means forming part of an antiskid system for releasing the brake when the vehicle is skidding or is about to skid.

In a brake actuating system of this kind a failure in the antiskid system may cause the antiskid means to operate to release the brake when skid conditions do not exist.

One object of the present invention is to provide an emergency brake applying mechanism for a system of the kind described which is not affected by the antiskid system.

According to one aspect of the present invention a brake actuating system comprises a first mechanism and a second mechanism operable separately to apply an associated brake, an antiskid means operable to release the brake, and a device for preventing operation of the antiskid means when the brake is applied by the second mechanism.

According to a second aspect of the present invention a brake actuating system comprises a first mechanism and a second mechanism operable separately to displace a link member in one direction to apply associated brake, an antiskid means operable to displace the link member in the opposite direction to effect release of the brake and a device for preventing operation of the antiskid means when the brake is applied by the second mechanism.

Two embodiments of the invention will now be described by way of example with reference to the accompanying drawings in which:

FIG. 5 is a diagrammatic axial cross-sectional view of an alternative brake actuating system according to the invention;

FIG. 6 is a diagrammatic axial cross-sectional view of a modification of part of the brake actuating system shown in FIG. 5.

Figure 1:
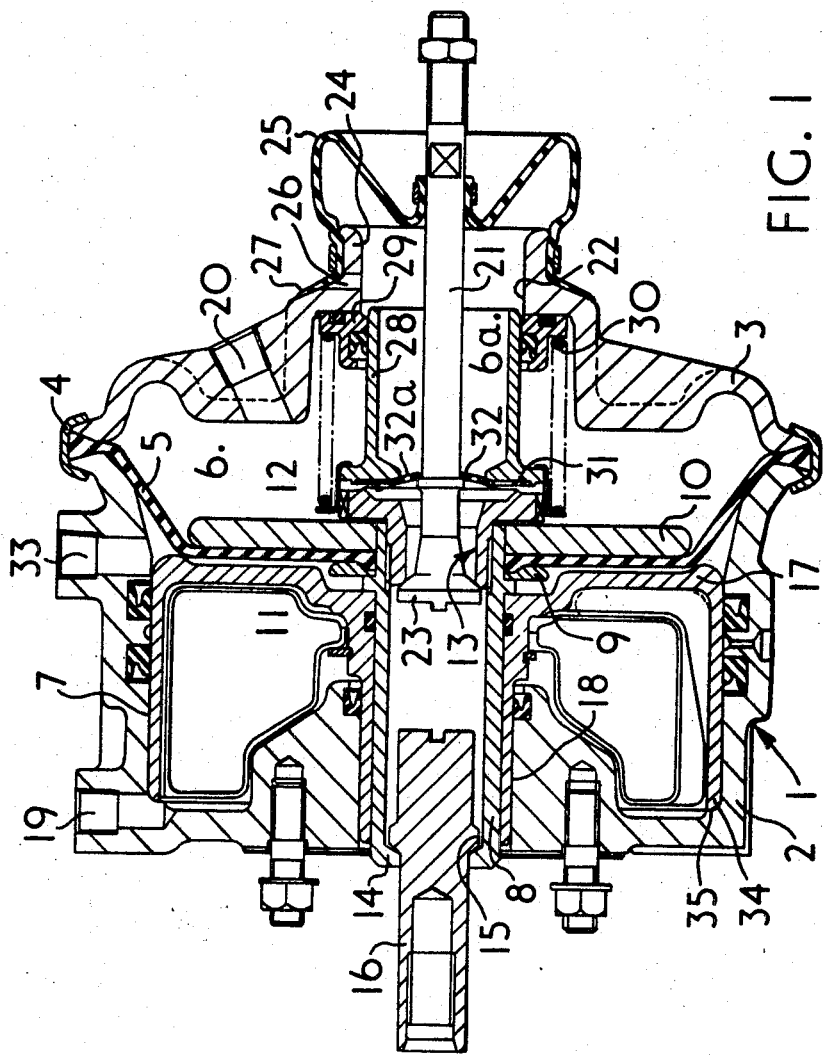
FIG. 1 is a diagrammatic axial cross-sectional view of a brake actuating system according to the invention.

In a first embodiment of the invention as shown in FIG. 1 a vehicle brake actuating system comprises a casing 1 formed from a cylindrical body portion 2 and an end portion 3 held together by a ring 4. A flexible annular diaphragm 5 is clamped at its outer periphery between the two portions 2, 3 of the casing and divides the interior of the casing 1 into a first chamber 6 and a second chamber 7.

A link member 8 in the form of a sleeve is secured to the inner periphery of the diaphragm 5 by means of a ring 9 and an annular disc 10 mounted one on each side of the diaphragm 5 on the sleeve 8 and held securely in position between an annular shoulder 11 formed on the sleeve and the head 12 of a plug 13 screwed into the end of the sleeve 8.

The other end of the sleeve is provided with a radially inwardly projecting lip 14 for engagement with an annular ridge 15 formed on a connecting rod 16 within the sleeve 8.

In the second chamber 7 an annular piston 17 is arranged to be slidable at its outer periphery on the body portion 2 and at its inner periphery to be slidable within a bore 18 formed in the body portion 2 and on the sleeve 8 arranged within the bore 18.

A passage 19 is provided in the body portion 2 for connection to a source of pressurised air (not shown) controlled by a valve operated by a brake pedal. Connection of the passage 19 to the source of pressurised air causes displacement of the piston 17 to the right as shown in FIG. 1 so that the piston engages the shoulder 11 on the sleeve 8 and causes the sleeve and the connecting rod 16 to be displaced with the piston.

The connecting rod 16 is linked to a brake (not shown) so that displacement of the rod 16 to the right applies the brake. Thus the arrangement of the piston 17 in the casing 1 constitutes a first brake applying mechanism.

An antiskid system is provided to effect release of the brake. The antiskid system comprises a skid sensing device arranged to operate a valve (not shown) to control flow of pressurised air to the chamber 6 through a passage 20 formed in the end portion 3 of the casing, and an antiskid means comprising the diaphragm 5, an increase of pressure in the chamber 6 acting to move the diaphragm 5 and hence the sleeve 8 to the left as seen in FIG. 1 to allow release of the brake.

A second brake applying mechanism in the form of a hand brake rod 21 for connection to a hand brake lever (not shown) for manual operation of the brake passes through an opening 22 formed in the end portion 3 of the casing 1. The rod 21 has an enlarged head 23 located within the sleeve 8 and engageable with the plug 13.

The rod 21 is normally arranged with a clearance between the head 23 and the plug 13. Displacement of the rod 21 to the right as seen in FIG. 1 causes engagement of the enlarged head 23 with the plug 13 after the clearance has been taken up causing displacement of the sleeve 8 and the connecting rod 16 to the right with the rod 21.

The opening 22 is defined by a lip 24 formed on the end portion 3 and a flexible rubber boot 25 is secured to the rod 21 and to the lip 24. Exhaust outlet passages 26 are formed in the lip 24 and the periphery 27 of the rubber boot forms a flap to cover the passages 26 to prevent ingress of foreign matter such as water or dirt.

The rod 21 is provided with a sleeve 28 arranged coaxially with the rod 21 and slidably engageable with an annular sealing member 29 held in contact with the end portion 3 by means of a spring 30 arranged between the sealing member 29 and the sleeve 28. The sealing member 29 is free to slide radially on the end portion 3 to allow for any slight misalignment of the sleeve 28 to ensure that the sleeve 28 can slide freely in an axial direction.

The sleeve 28 defines an exhaust chamber 6a within the first chamber 6 and a valve is provided to control flow of air between the first chamber 6 and the exhaust chamber 6a.

The valve comprises a resilient ring 31 on one end of the sleeve 28 which is engageable with a valve seat provided by the head 12 of the plug 13. The spring 30 acts to urge the sleeve 28 to the left as seen in FIG. 1 so that the ring 31 is in sealing engagement with the head 12 of the plug 13.

The rod 21 is provided with a part-spherical washer 32 having holes 32a formed therein for engagement with the sleeve 28.

When the brake is applied by the first brake applying mechanism the ring 31 is kept in sealing engagement with the plug 13 to close the valve and prevent flow of air between the chamber 6 and the chamber 6a. With this arrangement the antiskid means can operate to release the brake.

When the brake is applied by the second brake applying mechanism, that is by displacement of the rod 21 to the right, the part-spherical washer 32 engages the sleeve 28 and moves the sleeve 28 to the right with the rod 21 against the spring 30 before the clearance between the head 23 of the rod 21 and the plug 13 has been taken up. This opens the valve by moving the ring 31 off the head 12 of the plug 13 and air in the chamber 6 can flow to the exhaust chamber 6a through the holes 32a and to exhaust through passages 26. With this arrangement it is ensured that when the brake is applied by the second brake applying mechanism the chamber 6 is connected to exhaust and the antiskid means cannot operate to release the brake. This protects against the possibility of a failure in the antiskid system causing the chamber 6 to remain pressurised when skid conditions no longer exist.

A passage 33 is provided in the body portion 2 for connection of a supply of pressurised air to the portion of the chamber 7 between the piston head and the diaphragm 5 for servo assistance of the second brake applying mechanism. Displacement of the brake rod 21 to the right operates a valve (not shown) to allow flow of pressurised air through the passage 33. The end 34 of the piston 17 is engageable with an abutment face 35 on the casing 1 and thus connection of the passage 33 to the supply of pressurised air causes the diaphragm 5 to be moved to the right to effect servo assistance of the hand brake.

The head 23 of the rod 21 has curved sides and the centre of curvature of the part-spherical washer 32 is arranged to be the same as the centre of curvature of the head 23 of the rod 21. This arrangement allows slight movement of the rod 21 so that its axis is out of alignment with the axis of the sleeve 8 and ensures that in such a position the same displacement of the rod is required to open the valve and apply the brake as in the case where the axes are aligned.

Figure 2:
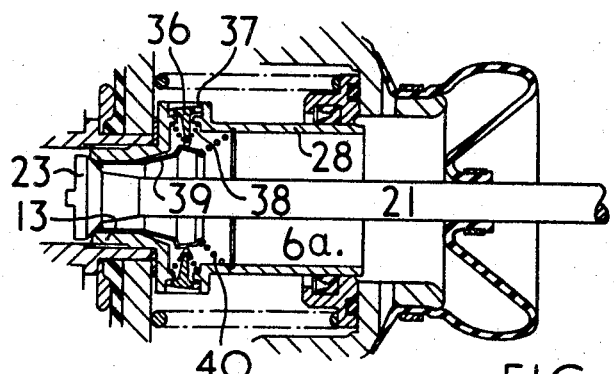

In a first modification of the first embodiment as shown in FIG. 2 the sleeve 28 is formed integrally with the plug 13 and the valve controlling flow of air between the chamber 6 and the chamber 6a comprises valve members 36 arranged in passages 37 in the sleeve 28. Springs 38 are provided to urge the valve members into the closed position. A cam member 39 is arranged around the rod 21 within the sleeve 28 so that initial movement of the rod 21 in a brake applying direction causes the valve members to tilt allowing flow of air from the chamber 6 to the chamber 6a.

A spring 40 is provided between the cam member 39 and an annular abutment on the sleeve 28 to urge the member 39 away from the valve members 36.

Figure 3:
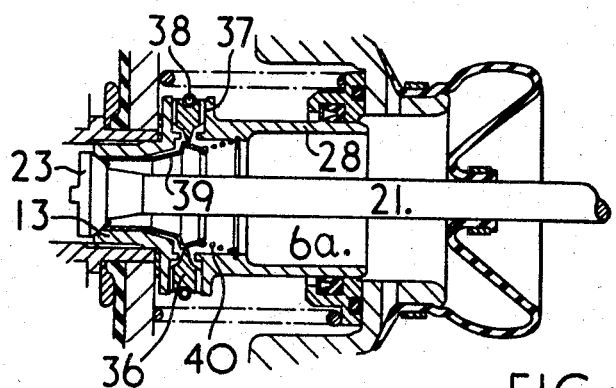

In a second alternative of the first embodiment shown in FIG. 3 the sleeve 28 is formed integrally with the plug 13 and the valve comprises valve members 36 arranged slidably in passages 37 formed in the sleeve 28, initial displacement of the rod 21 in a brake applying direction causing engagement of a tubular cam member 39 with the valve members 36 to allow flow of air between the chamber 6 and the chamber 6a. A circular spring 38 is provided to urge the valve members into the closed position.

Figure 4:
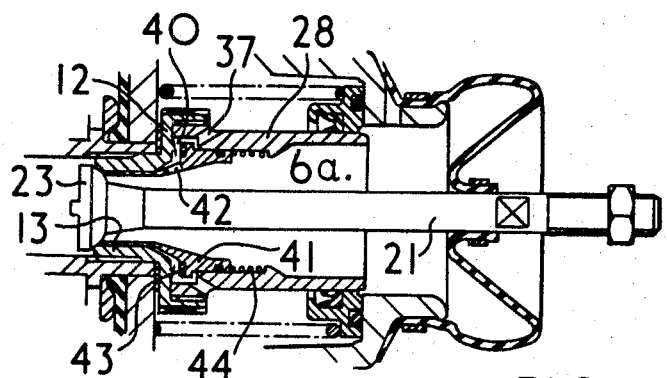
FIGS. 2, 3 and 4 are diagrammatic axial cross-sectional views of modifications of part of the brake actuating system shown in FIG. 1.

In a third modification of the first embodiment and shown in FIG. 4 the sleeve 28 is secured to the plug 13 and the valve comprises passages 37 formed in the sleeve 28 and communicating with a recess 40 formed in the sleeve. A tubular member 41 is arranged around the rod 21 and has holes 42 formed therein. A valve member 43 in the form of a resilient ring is formed on the tubular member 41 and a spring 44 is arranged between the tubular member 41 and an annular abutment formed on the sleeve 28 to urge the valve member 43 into sealing engagement with a valve seat provided by the head 12 of the plug 13 to prevent flow of air from the recess 40 to the chamber 6a. Initial displacement of the rod 21 moves the valve member 43 away from the plug 13 so that air can flow between the recess 40 through holes 43 to chamber 6a.

In a second embodiment of the invention as shown in FIG. 5 the brake actuating mechanism comprises a casing 50 formed from two end portions 51, 52 and two annular body portions 53, 54. Three diaphragms 55, 56, 57 are secured at their outer peripheries respectively between two adjacent portions of the casing. The three diaphragms divide the casing into four chambers 58, 59, 60, 61.

A link member 62 in the form of a connecting rod is secured to the first diaphragm 55 and arranged to be connected to a brake so that displacement of the first diaphragm 55 to the right as shown in FIG. 5 applies the brake.

The chamber 59 is provided with a passage 63 for connection to a source of pressurised fluid controlled by a valve operated by a brake pedal (not shown), an increase in pressure in the chamber 59 acting to displace the diaphragm 55 and the rod 62 in a brake applying direction.

The diaphragm 55 thus forms part of a first brake applying mechanism.

The chamber 61 is provided with a passage 64 for connection to a source of pressurised air controlled by a valve operated by a hand lever (not shown) an increase in pressure in the chamber 61 acting to apply a thrust to the diaphragm 57 which is transmitted to the diaphragm 55 by the spacers 65, 66 to cause displacement of the rod 62 in a brake applying direction. The spacers 65, 66 are rubber blocks secured respectively to the diaphragms 57 and 56. The diaphragm 57 thus forms part of a second brake applying mechanism.

The chamber 60 acts as an isolation chamber between the chamber 59 and the chamber 61 and is open to atmospheric pressure through the passage 67. Thus, if failure of one diaphragm occurs pressurised air leaks to the atmosphere from the associated chamber only and the brake can be applied by the unaffected brake applying mechanism.

The chamber 58 is provided with a passage 68 for connection to a source or pressurised air controlled by a valve operated by a skid sensing device (not shown). The diaphragm 55 forms part of an antiskid means, an increase in pressure in the chamber 58 acting to move the diaphragm 55 and the rod 62 to the left to release the brake.

A spring 69 is provided to urge the diaphragm 55 to the left.

A device 70 is provided to connect the chamber 58 to exhaust when the brake is applied by the second brake applying mechanism. The device is a valve comprising a valve body 71 having two inlet 72, 73 and two outlets 74, 75 formed therein. A valve stem 76 is arranged to be movable within the valve body and is supported by two annular diaphragms 77, 78. A portion 79 of the valve stem is arranged for sealing engagement with a valve seat 80 formed on the valve body 71.

In the normal closed condition of the valve air can flow through the valve body from the source of pressurised air for operation of the antiskid means to the chamber 58. Pressure within the valve body acts on the diaphragm 77 tending to keep the valve closed and the pressure acts on the portion 79 tending to open the valve. The diaphragm 77 is arranged to provide a slight inbalance to hold the valve in the closed position.

The valve stem 76 is exposed at one end 81 to pressure in the chamber 61 and at its other end 82 to pressure in the exhaust outlet 75 which is open to atmospheric pressure.

When the brake is applied by the second mechanism the increase in pressure in the chamber 61 acts to move the valve member 76 to open the valve. The portion 79 moves away from the valve seat 80 to allow flow of fluid from the valve body to exhaust through apertures in the diaphragm 78 thereby preventing operation of the antiskid means.

With this arrangement air flows from the source of pressurised air through passage 73 to exhaust and from the chamber 58 through passage 74 to exhaust. Thus chamber 58 cannot be exhaust until the source has been exhausted and this will cause a slight delay after operation of the hand brake lever before the brake is applied. Where this delay is undesirable the modification of the valve 70 shown in FIG. 6 is preferred.

In the modification of the valve 70 shown in FIG. 6 the valve stem 76 is provided with a second portion 83 engageable with a second valve seat 84 to close the passage 73 when the valve is in the open position. This prevents flow of air from the source when the valve is open and chamber 58 can be rapidly exhausted.

Having now described my invention, what I claim is:

1. A brake actuating system comprising a first mechanism and a second mechanism operable separately to apply an associated brake, an antiskid means operable to release the brake, and a device for preventing operation of the antiskid means when the brake is applied by the second mechanism.

2. A brake actuating system comprising a first mechanism and a second mechanism operable separately to displace a link member in one direction to apply an associated brake, an antiskid means operable to displace the link member in the opposite direction to effect release of the brake and a device for preventing operation of the antiskid means when the brake is applied by the second mechanism.

3. A brake actuating mechanism according to claim 2 wherein the antiskid means comprises a first flexible diaphragm arranged in a casing and having a first chamber formed within the casing on one side of the diaphragm, the link member being secured to the diaphragm so that an increase in fluid pressure in the chamber tends to displace the diaphragm and the link member in the said opposite direction.

4. A brake actuating mechanism according to claim 3 wherein the link member comprises a first sleeve secured to the diaphragm and extending axially thereto on the other side of the diaphragm to the first chamber, the sleeve being engageable at its end remote from the diaphragm with a connecting rod arranged to be linked to the brake.

5. A brake actuating mechanism according to claim 4 wherein the diaphragm is of annular form and is secured at its outer periphery to the casing and at its inner periphery to the casing and at its inner periphery to the sleeve.

6. A brake actuating system according to claim 4 wherein the first mechanism is a piston slidable within a second chamber formed in the casing on the said other side of the diaphragm, the piston being of annular form and being arranged around the first sleeve and engageable with the sleeve so that displacement of the piston in a brake applying direction causes displacement of the sleeve with the piston.

7. A brake actuating system according to claim 3 wherein the second mechanism comprises a hand brake rod extending axially with respect to the diaphragm on the said one side of the diaphragm, the hand brake rod being engageable with the link member so that displacement of the rod in a brake applying direction causes displacement of the link member with the rod.

8. A brake actuating system according to claim 7 wherein the second mechanism includes the diaphragm, the hand brake rod being arranged to cause an increase in pressure in the portion of the second chamber between the diaphragm and the piston when the hand brake rod is displaced in the brake applying direction.

9. A brake actuating system according to claim 7 wherein the device comprises an exhaust chamber provided with an outlet and a valve, the valve being arranged to be operated by displacement of the hand brake rod to allow flow of fluid between the first chamber and the exhaust chamber.

10. A brake actuating system according to claim 9 wherein the exhaust chamber is defined by a second sleeve arranged around the hand brake rod within the first chamber, the sleeve having a first end in sealing and sliding engagement with the casing and a second end for association with the first sleeve.

11. A brake actuating system according to claim 10 wherein the valve comprises the second end of the second sleeve arranged for sealing engagement with a valve seat associated with the link member and the hand brake rod is arranged to be engageable with the second sleeve so that on displacement of the hand brake rod in a brake applying direction the second sleeve is displaced with the rod away from the valve seat before the rod engages the link member to cause displacement of the link member.

12. A brake actuating system according to claim 10 wherein the second end of the second sleeve is secured to the link member, and the valve comprises at least one radially extending passage formed in the second sleeve and having a valve member arranged therein, the hand brake rod having a cam member associated therewith so that on displacement of the hand brake rod in a brake applying direction the cam member displaces the valve member to allow flow of fluid along the passage between the exhaust chamber and the first chamber before the rod engages the link member to cause displacement of the link member.

13. A brake actuating system according to claim 10 wherein the second end of the second sleeve is secured to the link member and the valve comprises at least one passage formed in the second sleeve, a tubular member being associated with the hand brake rod and being arranged to be slidable on the inner surface of the second sleeve, the tubular member having a valve member associated therewith for sealing engagement with a valve seat associated with the link member to effect closure of the passage, and the hand brake rod being arranged to be engageable with the tubular member so that on displacement of the hand brake rod in a brake applying direction the valve member is displaced away from the valve seat to allow flow of fluid through the passage from the first chamber to the exhaust chamber before the rod engages the link member to cause displacement of the link member.

14. A brake actuating mechanism according to claim 3 wherein the first mechanism comprises the first diaphragm, a second chamber being formed in the casing on the other side of the diaphragm to the first chamber, an increase in pressure in the second chamber tending to cause displacement of the diaphragm and the link member in the said one direction.

15. A brake actuating mechanism according to claim 14 wherein the link member comprises a connecting rod secured to the first diaphragm and extending axially thereto on the said one side of the diaphragm.

16. A brake actuating mechanism according to claim 14 wherein the second mechanism comprises a second flexible diaphragm secured to the casing and arranged parallel to the first diaphragm, a third chamber being formed in the casing between the casing and the second diaphragm, and a spacer being arranged between the first diaphragm and the second diaphragm to transmit a thrust applied to the second diaphragm by an increase in pressure in the third chamber to the first diaphragm to cause displacement of the first diaphragm and the link member in the said one direction.

17. A brake actuating mechanism according to claim 16 wherein a third flexible diaphragm is secured to the casing and arranged between the first and second diaphragms so as to provide a fourth chamber between the second chamber and the third chamber.

18. A brake actuating mechanism according to claim 17 wherein the fourth chamber is open to atmospheric pressure.

19. A brake actuating mechanism according to claim 16 wherein the device comprises a valve operated by an increase in pressure in the third chamber, corresponding to application of the brake by the second mechanism, to connect the first chamber to an exhaust outlet.

20. A brake actuating mechanism according to claim 19 wherein the first chamber is arranged to be connected to a source of pressurised fluid through the valve for operation of the antiskid means.

21. A brake actuating mechanism according to claim 20 wherein the valve comprises a valve stem movable within a valve body and having one end exposed to pressure in the third chamber and the other end exposed to pressure in the exhaust outlet, the valve stem having a portion for sealing engagement with a valve seat associated within the valve body, an increase in pressure in the fourth chamber causing displacement of the valve stem to move the said portion off the valve seat and allow flow of fluid from the first chamber through the valve body to the exhaust outlet.

22. A brake actuating mechanism according to claim 21 wherein the valve stem is supported in the valve body by two axially spaced supporting diaphragms, one supporting diaphragm being exposed to pressure in the valve body on one side only so as to balance the pressure within the valve body acting to open the valve.

23. A brake actuating mechanism according to claim 22 wherein the valve stem is provided with a second portion for sealing engagement with a second valve seat associated with the valve body to prevent flow of fluid from the said source to the fourth chamber when the valve stem is displaced by pressure in the third chamber.

References Cited
UNITED STATES PATENTS

| | | | |
|---|---|---|---|
| 3,276,822 | 10/1966 | Lister et al. | 303—21 |
| 3,288,232 | 11/1966 | Shepherd | 303—21 X |
| 3,425,751 | 2/1969 | Wehde et al. | 188—181 X |

MILTON BUCHLER, Primary Examiner

J. J. McLAUGHLIN, Jr., Assistant Examiner

U.S. Cl. X.R.

188—181; 303—6, 9, 13, 61, 68

PO-1050
(5/69)

UNITED STATES PATENT OFFICE
CERTIFICATE OF CORRECTION

Patent No. __3,536,362__                    Dated __10-27-70__

Inventor(s) __John Walter Davis__

It is certified that error appears in the above-identified patent and that said Letters Patent are hereby corrected as shown below:

Column 2, line 14; The word "arranged" has been omitted, and should read: "connecting rod 16 arranged within"

Specification, page 3, line 28

Column 4, line 59; The word "or" should be -- of --.

Specification, page 9, line 18

Column 5, line 23; The word "exhaust" should be -- exhausted --.

Specification, page 10, line 24

Column 5, line 66; The words "and at its inner periphery to the casing" should be deleted.

Claims - Claim 5

SIGNED AND
SEALED
MAR 16 1971

(SEAL)
Attest:

Edward M. Fletcher, Jr
Attesting Officer

MAR. 16, 1971

WILLIAM E. SCHUYLER, JR
Commissioner of Patents